(12) United States Patent
Ahlborg et al.

(10) Patent No.: US 12,083,667 B2
(45) Date of Patent: Sep. 10, 2024

(54) METHOD FOR FILTERING A SENSOR SIGNAL AND DEVICE FOR CONTROLLING AN ACTUATOR BY FILTERING A SENSOR SIGNAL

(71) Applicant: EUROIMMUN Medizinische Labordiagnostika AG, Lübeck (DE)

(72) Inventors: Felix Ahlborg, Lübeck (DE); Arne Von Drathen, Lübeck (DE); Siegfried Wessel, Lübeck (DE)

(73) Assignee: EUROIMMUN Medizinische Labordiagnostika AG, Lübeck (DE)

( * ) Notice: Subject to any disclaimer, the term of this patent is extended or adjusted under 35 U.S.C. 154(b) by 2 days.

(21) Appl. No.: 18/084,869

(22) Filed: Dec. 20, 2022

(65) Prior Publication Data
US 2023/0202052 A1 Jun. 29, 2023

(30) Foreign Application Priority Data
Dec. 21, 2021 (EP) .................................... 21216646

(51) Int. Cl.
*G05B 19/4155* (2006.01)
*B25J 13/08* (2006.01)

(52) U.S. Cl.
CPC .......... *B25J 13/08* (2013.01); *G05B 19/4155* (2013.01); *G05B 2219/50391* (2013.01)

(58) Field of Classification Search
CPC ........ G05B 19/4155; G01D 3/02; G01D 5/24; H03M 1/06; H03M 1/08; H03M 1/34; H03M 1/60
USPC ....................................................... 708/300
See application file for complete search history.

(56) References Cited

U.S. PATENT DOCUMENTS

| | | | |
|---|---|---|---|
| 7,085,685 B2 * | 8/2006 | Poluzzi | H04R 3/005 700/50 |
| 7,318,079 B2 | 1/2008 | Hahn | |
| 9,683,866 B2 | 6/2017 | Buhmann | |
| 9,976,924 B2 | 5/2018 | Straeussnigg et al. | |

FOREIGN PATENT DOCUMENTS

| | | |
|---|---|---|
| DE | 102011085547 A1 | 5/2013 |
| DE | 102011118612 B4 | 8/2013 |
| DE | 102016107245 A1 | 10/2016 |
| EP | 1489742 A2 | 12/2004 |
| EP | 1489742 A3 | 1/2006 |
| EP | 3165931 A1 | 5/2017 |

* cited by examiner

*Primary Examiner* — Tan V Mai
(74) *Attorney, Agent, or Firm* — Bochner PLLC; Andrew D. Bochner

(57) ABSTRACT

A method according to the invention is proposed for filtering a sensor signal, said method comprising various steps. A time-discrete sensor signal is provided as an input signal, and an output signal is generated via a continuous filtering of the input signal using a time-discrete filter in the time domain, which performs the following filter steps for each value of the input signal: comparing a specified signal value of a specified time index of the input signal with two further signal values of the input signal, wherein a first signal value of the two further signal values is temporally prior to the specified signal value and wherein a second signal value of the further signal values is temporally after the specified signal value, and replacing the specified signal value in the output signal by a new value in dependence on a value interval spanned by the two further signal values.

13 Claims, 9 Drawing Sheets

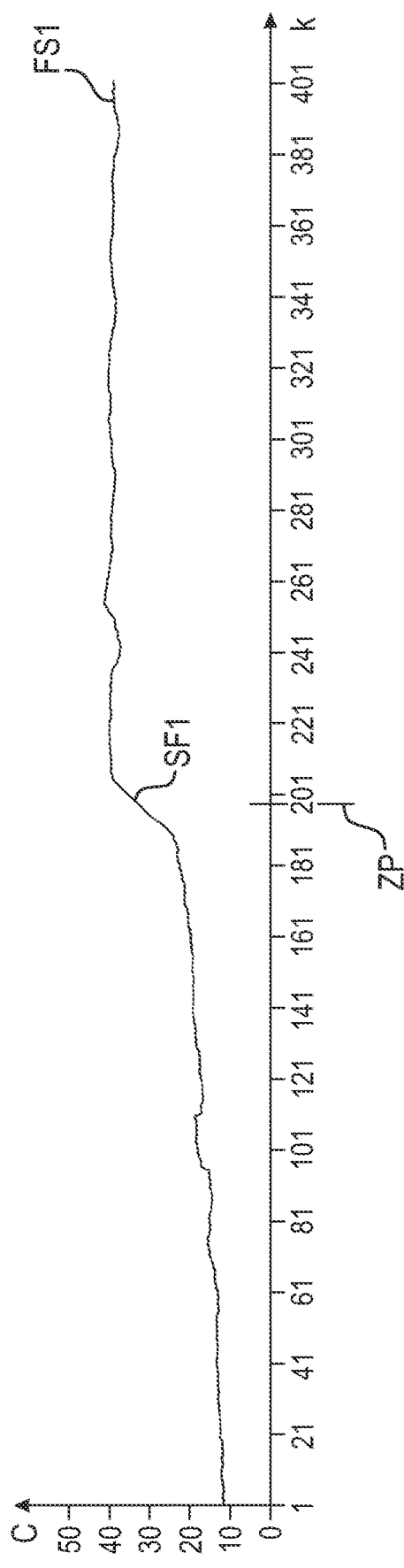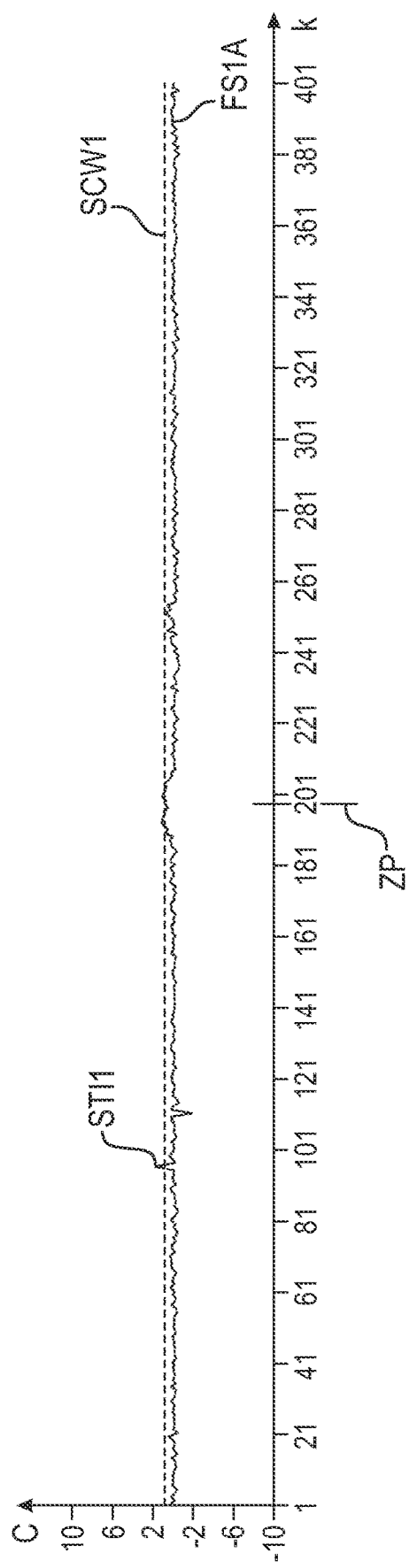

Figure 1:
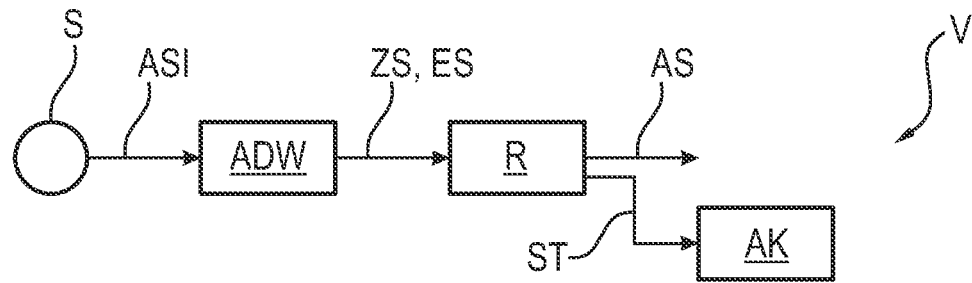

METHOD FOR FILTERING A SENSOR SIGNAL AND DEVICE FOR CONTROLLING AN ACTUATOR BY FILTERING A SENSOR SIGNAL

The invention relates to a method for filtering a sensor signal and also to a device for controlling an actuator by filtering a sensor signal.

For recording states or detecting events in the engineering-physical world, it is common to acquire a sensor signal using a sensor and to filter it, for example, to reduce noise interference and/or pulse-like interference in the sensor signal.

Time-discrete filters are well known as filtering methods. Simple filters are, for example, a so-called median filter or a mean filter or arithmetic mean filter.

In such time-discrete filtering methods in the time domain, a new output value for an output signal is determined for a specified time index by combining multiple input values of multiple discrete instants with each other arithmetically, in order then to determine the one output value of the output signal at the one time-discrete instant.

An output signal determined in this way can then be used, for example, to detect an event. For example, when acquiring a sensor signal using a pressure sensor, the exceeding of a specified pressure value can be detected. Preferably, in such a case or upon detection of such an event, an actuator can then be controlled to bring about specific effects in the physical-technical world.

A wide variety of sensor types are known. For example, there are capacitive sensors, pressure sensors, strain sensors, humidity sensors, and many other forms of sensors. These sensors have in common that the analogue electrical sensor signals they provide are subject to noise interference and possibly also pulse-like interference, which distort the actually expected sensor signal slightly or even severely.

In addition to time-discrete filters, other filtering methods are also known, for example in the frequency domain.

Different filtering methods have different effects on the output signal. Methods with complex filtering, for example by transforming the time-discrete input signal into a discrete frequency space, filtering in the discrete frequency space and back transformation into a time-discrete output signal, possibly also with overlapping of time-discrete output signal blocks via overlap-add methods, can sometimes generate a certain latency.

Each time-discrete filter in a time-discrete implementation, for example as a FIR filter or II R filter, also generates a certain signal latency. A result of such signal latencies is that, on the basis of the output signal a detection of a specific event, which is indicated in the input signal by a specific signal waveform such as a signal jump, can only be identified subject to a time delay with the corresponding latency.

At the same time, it is also the case that different filtering methods effect different reductions of a noise interference and/or pulse interference, in each case to different degrees.

Such aspects are not always able to be optimized at once, in such a way that all these aspects can be achieved together to the maximum possible degree of each one. Some filtering methods achieve higher noise reduction, but at the cost of a higher signal latency. Further relationships are possible and known.

Different methods of time-discrete signal filtering are given in "Digital Signal Processing—Filtering and Spectral Analysis with MATLAB® Exercises—K.-D. Kammeyer, K. Kroschel, Springer Vieweg, Wiesbaden, Germany, 21 Apr. 2018" and "A. Mertins: Signal theory: Fundamentals of signal description, filter banks, wavelets, time-frequency analysis, parameter and signal estimation. Springer Vieweg, 4th edition, 2020."

FIG. 1 shows a sensor S which provides an analogue sensor signal AS. This analogue sensor signal is converted using a converter unit ADW, in particular an A-to-D converter, into a time-discrete sensor signal ZS. This time-discrete sensor signal ZS can be understood as a time-discrete input signal ES. A computing unit R can then determine a time-discrete output signal AS via time-discrete filtering in the time domain. Further, the computing unit R can preferably detect a specified event on the basis of the output signal AS, in order then to output a specified control signal ST to an actuator AK.

The object of the present invention is to provide a filtering method for filtering a time-discrete input signal and determining a time-discrete output signal, which counteracts both an interference variable such as additive noise while at the same time distorting the input signal as little as possible.

The object according to the invention is achieved by the method according to the invention for filtering a sensor signal according to claim 1.

The object according to the invention is further achieved by a device according to the invention for controlling an actuator by filtering a sensor signal according to claim 10.

A method according to the invention is proposed for filtering a sensor signal, said method comprising various steps. A time-discrete sensor signal is provided as an input signal, an output signal is generated via a continuous filtering of the input signal using a time-discrete filter in the time domain, which performs the following filter steps for each value of the input signal: comparing a specified signal value of a specified time index of the input signal with two further signal values of the input signal, wherein a first signal value of the two further signal values is temporally prior to the specified signal value and wherein a second signal value of the further signal values is temporally after the specified signal value, and replacing the specified signal value in the output signal by a new value in dependence on a value interval spanned by the two further signal values.

Preferably, either the specified signal value of the input signal is retained in the output signal or the specified signal value of the input signal is replaced in the output signal by a new value, depending on a comparison of the specified signal value of the input signal with a value interval spanned by the two further signal values of the input signal.

In order to set out one or more possible advantages of the method according to the invention, more detailed statements are made in the following.

Figure 8:
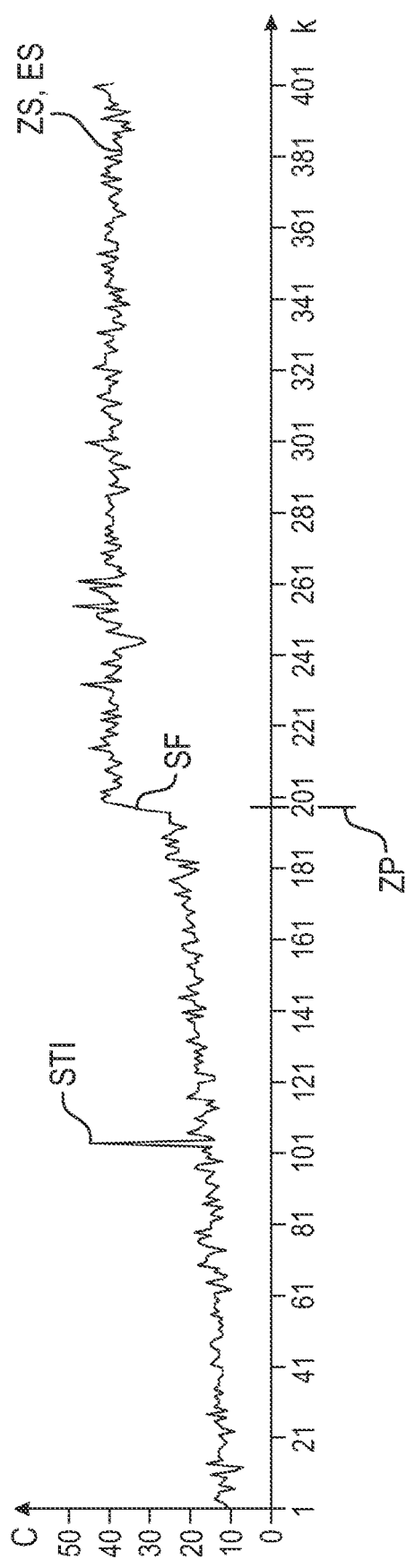

FIG. 8 shows an exemplary input signal ES, which is superimposed with additive noise and has a signal edge SF at a specified time ZP. Such a signal edge SF indicates a specific event in the physical-technical world. Furthermore, the sensor signal ES has an interference pulse STI. Both the additive noise and the interference pulse STI should be reduced by time-discrete filtering in order then to be able to detect a signal edge SF or an event indicated by the signal edge SF on the basis of the output signal, as far as possible without significant signal latency.

Figure 9:
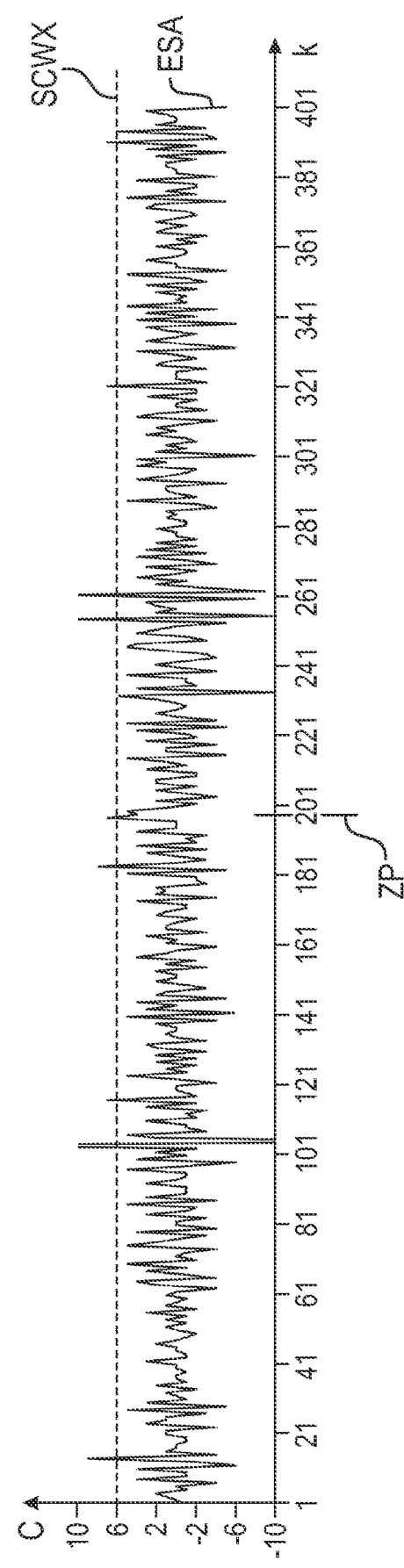

FIG. 9 shows the first derivative of the time-discrete signal ES as a signal ESA. For example, the signal-to-noise ratio is less than 1.

Detection of the event or the signal edge SF at the time ZP based on the signal ESA using a threshold value SCW may not necessarily lead to a reliable detection result. Other signal values of the signal ESA at other times also exceed the threshold value SCWX.

FIG. 10A shows an exemplary output signal FS1 in the case where a standard continuous arithmetic mean filter is applied to the input signal ES from FIG. 8.

The remaining edge SF1 has a lower edge steepness than the original edge SF from the signal ES. However, noise components and a pulse have been reduced. A first derivative FS1A of the signal FS1 is shown in FIG. 10B. In this case, an application of a threshold value SCW1 for detecting the event at the time ZP is still problematic since other signal components such as the remaining pulse STI1 in the signal FS1A also exceed the threshold value SCW1.

Figure 11A:
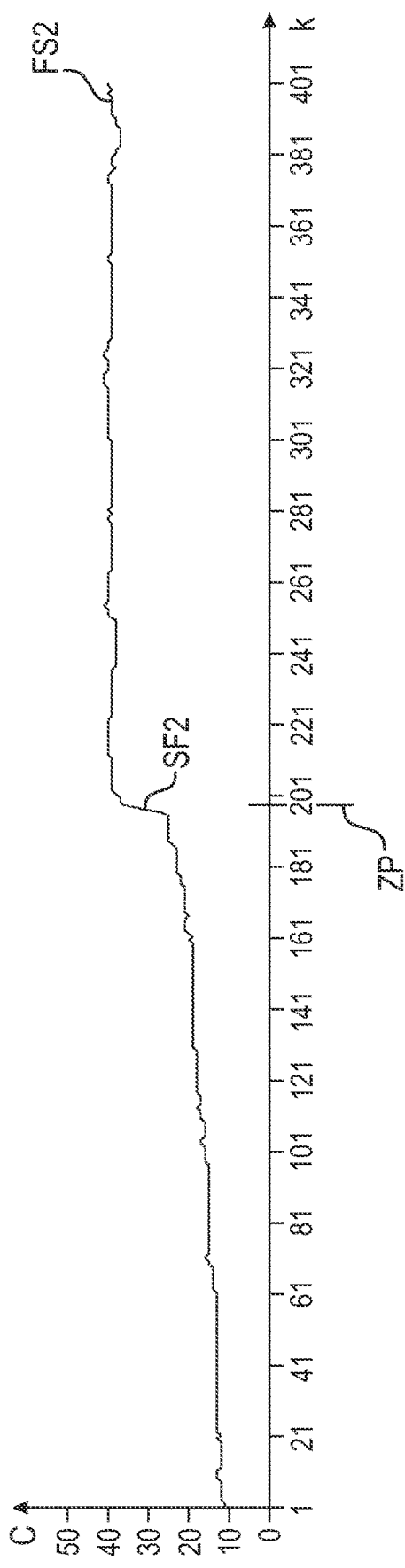

FIG. 11A shows an exemplary output signal FS2, in which a known continuous median filtering using a time-discrete median filter has been applied to the input signal.

Figure 11B:
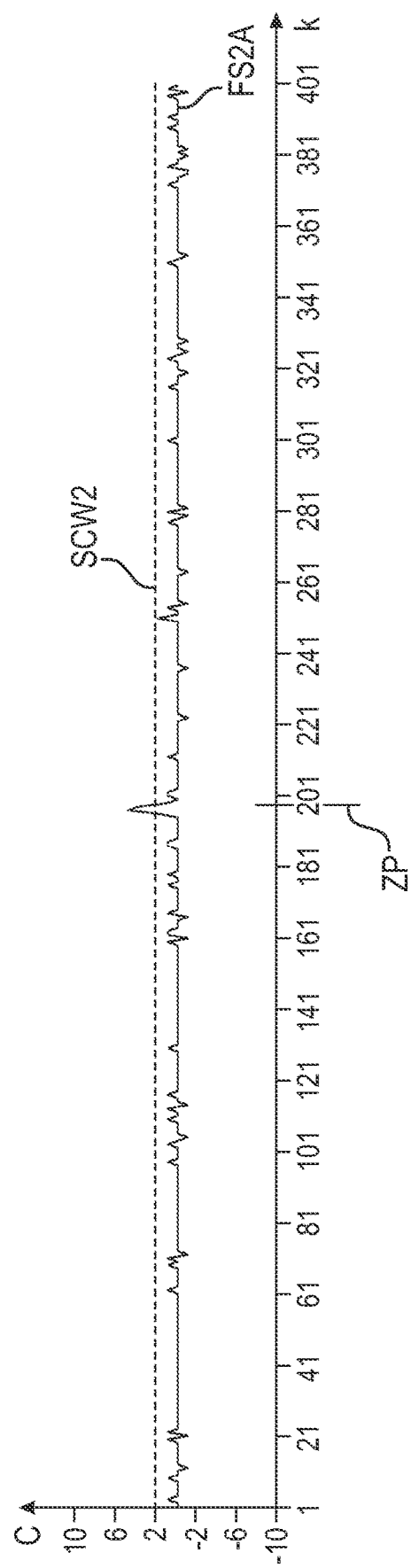

The remaining signal edge SF2 has a higher edge steepness than in the case of the arithmetic mean filter, see FIG. 10A. However, noise components can only be reduced to a lesser extent than with an arithmetic mean filtering. A first derivative FS2A of the output signal FS2 shown in FIG. 11B allows an application of a threshold value SCW2 here, to detect an event or a signal increase at the time ZP.

The resulting signal-to-noise ratio has an exemplary value of 2.5.

When using the arithmetic mean filter, a signal-to-noise ratio of only less than 1 is achieved.

The examples of time-discrete filtering methods known and described have in common that a specified output value is always determined by a fixed application of an arithmetic combination of multiple input values.

It is this aspect from which the method according to the invention explicitly deviates, since according to the invention, the specified signal value of the specified time index is compared with a value interval which is spanned by two further signal values, and the specified signal value is replaced in the output signal by a new value depending on the value interval spanned by the further signal values. Preferably, either the specified signal value of the input signal is retained in the output signal or the specified signal value of the input signal is replaced in the output signal by a new value, depending on a comparison of the specified signal value of the input signal with a value interval spanned by the two further signal values of the input signal.

The specified signal value is thus replaced by a new value that can be determined by arithmetic combination of multiple input values, not for each specified signal value of the input signal.

Figure 12A:
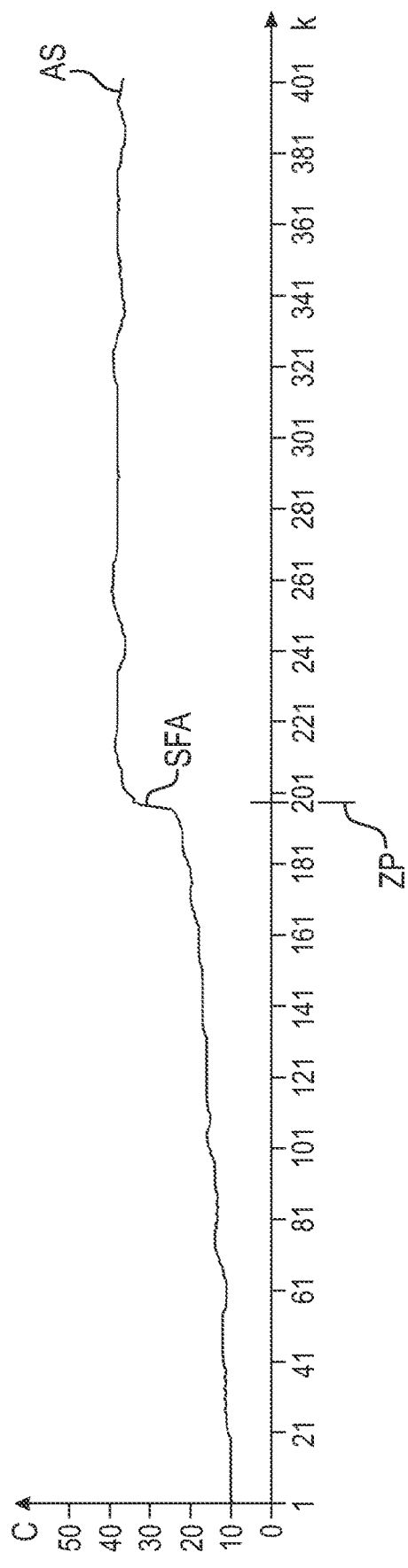

The result is shown in FIG. 12A, which shows an output signal AS, which was determined via the time-discrete filtering according to the invention.

The edge steepness of the remaining edge SFA at time ZP is significantly higher than that of the edges SF1 or SF2 from FIGS. 10A and 11A when using a mean value filter or a median filter. Furthermore, in this signal example a signal-to-noise ratio of 14 is achieved in the filtered signal. Thus, the method according to the invention achieves a higher signal-to-noise ratio together with higher edge steepness than in the conventional methods of time-discrete filtering. As can be seen from FIG. 12A, the presence of the noise component and also that of the interference pulse STI, see FIG. 8, in the output signal AS has been reduced more sharply than in the conventional methods of time-discrete filtering. Since only the specified value has to be compared with the value interval, no complex calculation of filter coefficients, e.g. of a Wiener filter or a Kalman filter, is necessary.

Figure 12B:
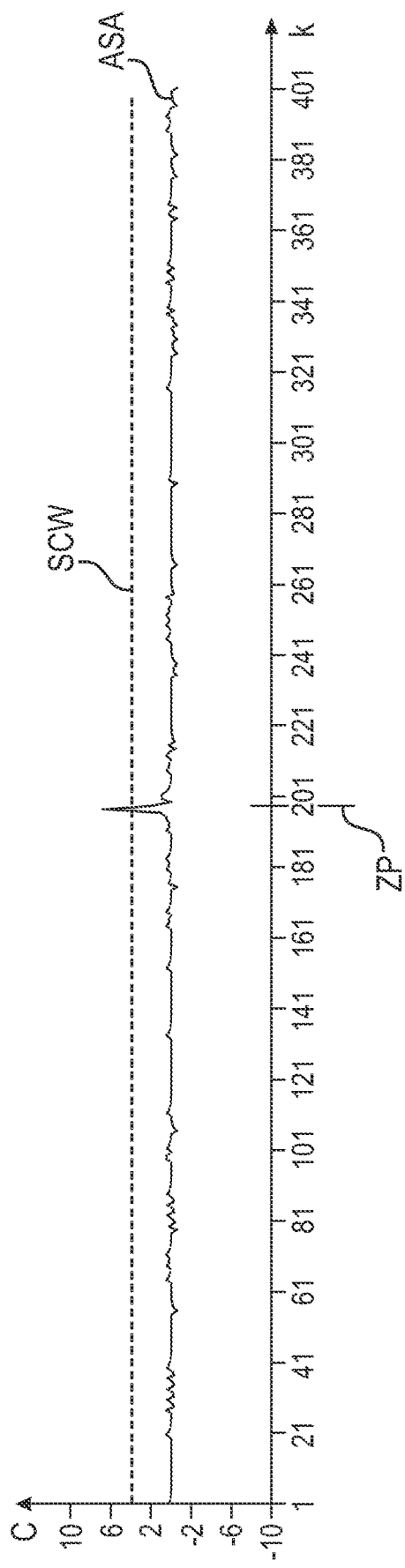

The first derivative ASA from FIG. 12B of the output signal AS can now be used for detecting an event at the specified time ZP via threshold application of a threshold value SOW.

In other words: the method according to the invention, in which only in certain cases is the specified signal value replaced by a new value depending on a value interval spanned by the further signal values, is thus superior to the known methods with regard to a reduction of noise and/or interference components as well as a preservation of an edge steepness.

It should be noted that in order to detect the event, the analysis of the output signal AS by computing its first derivative ASA and determining whether a predefined threshold value is exceeded is only one method illustrated in more detail here and only one example for detecting the event by detecting a significant signal change on the basis of the output signal. Another example would be edge detection or slope detection in the output signal using a Sobel operator or a Laplace operator. Other detection methods for slope detection or edge detection can be used here.

Advantageous embodiments of the invention are the subject matter of the dependent claims and are explained in more detail in the following description with partial reference to the figures.

Preferably, the method is characterized in that, in the event that a predefined condition is fulfilled by the specified value in relation to the value interval, the specified signal value is replaced by the new value, and that in the event that the predefined condition is not fulfilled by the specified value with respect to the value interval, the specified signal value of the input signal is retained unchanged in the output signal.

Preferably, the specified signal value in the output signal is then replaced by a new value depending on a value interval spanned by the two further signal values, if the specified signal value is outside the value interval spanned by the two further signal values.

The new value is preferably determined on the basis of the two further signal values.

The new value is preferably determined as the mean value of the two further signal values.

The new value is preferably selected as one of the two further signal values from which the specified value has a smaller deviation.

Preferably, the new value is determined depending on one of the two further signal values from which the specified value has a smaller deviation, and on a difference of the specified signal value and the one of the second further signal values. Particularly preferably, the new value is also determined in accordance with a correction value.

Preferably, in the case that the specified signal value is within the value interval spanned by the two further signal values, the specified signal value at the specified time index is retained unchanged, and further, in the case that the specified signal value is not within the value interval spanned by the two further signal values, the specified signal value at the specified time index is replaced by the new value.

The two further signal values preferably each have the same temporal distance to the specified signal value.

The method preferably also comprises the steps of: applying the time-discrete filter of claim 1 to the input signal in a first filter stage to generate the output signal, providing the output signal of the first filter stage as a second input signal of a second filter stage, and applying the time-discrete filter of claim 1 to the second input signal in the second filter stage to generate a second output signal.

Preferably, the method is configured such that in the first filter stage in the time-discrete filter the two further signal values have a first equal temporal distance to the specified signal value, that in the second filter stage in the time discrete filter the two further signal values also have a second equal temporal distance to the specified signal value, and that the second temporal distance is additionally greater than the first temporal distance.

The method preferably also comprises the steps of: detecting an event upon detecting a significant signal change on the basis of the output signal and controlling an actuator upon detection of the event.

Preferably, the sensor signal is detected using a capacitive sensor.

Also proposed is a device for controlling an actuator by filtering a sensor signal, comprising: a sensor for detecting an analogue sensor signal, in particular a capacitive sensor, a converter for providing the analogue sensor signal in the form of a time-discrete sensor signal as an input signal, a computing unit for receiving the input signal, and also an actuator. The computing unit is designed to carry out the step of generating an output signal by continuously filtering the input signal using a time-discrete filter in the time domain. The filter carries out the filtering steps for each value of the input signal: comparing a specified signal value of a specified time index of the input signal with two further signal values of the input signal, wherein a first signal value of the two further signal values is temporally prior to the specified signal value and wherein a second signal value of the further signal values is temporally after the specified signal value, and replacing the specified signal value in the output signal by a new value in dependence on a value interval spanned by the two further signal values. Furthermore, the computing unit is designed to carry out the steps of: detecting an event by detecting a significant signal change on the basis of the output signal, and outputting a control signal to the actuator upon detecting the event.

Preferably, the control signal is a signal for controlling the actuator or a signal for stopping the actuator.

Figure 2:
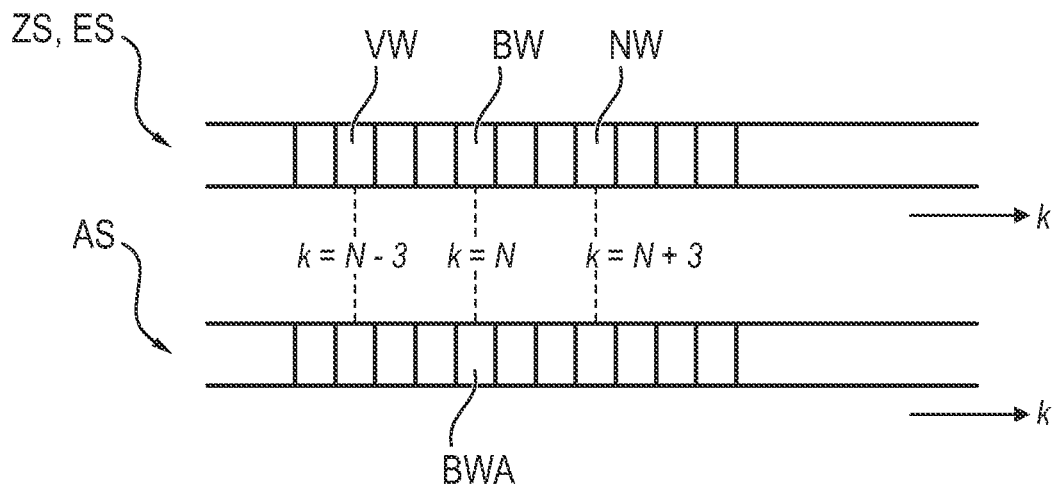
Figure 3:
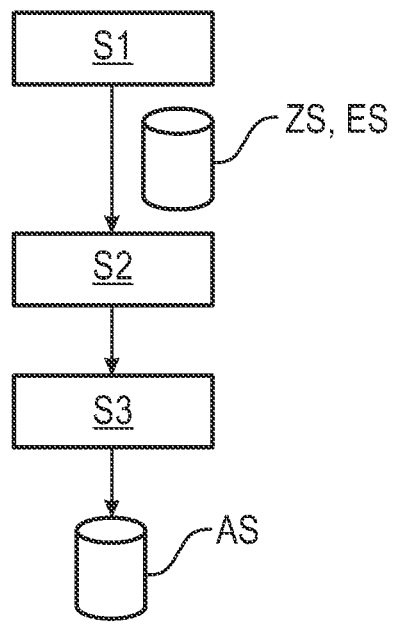
Figure 4:
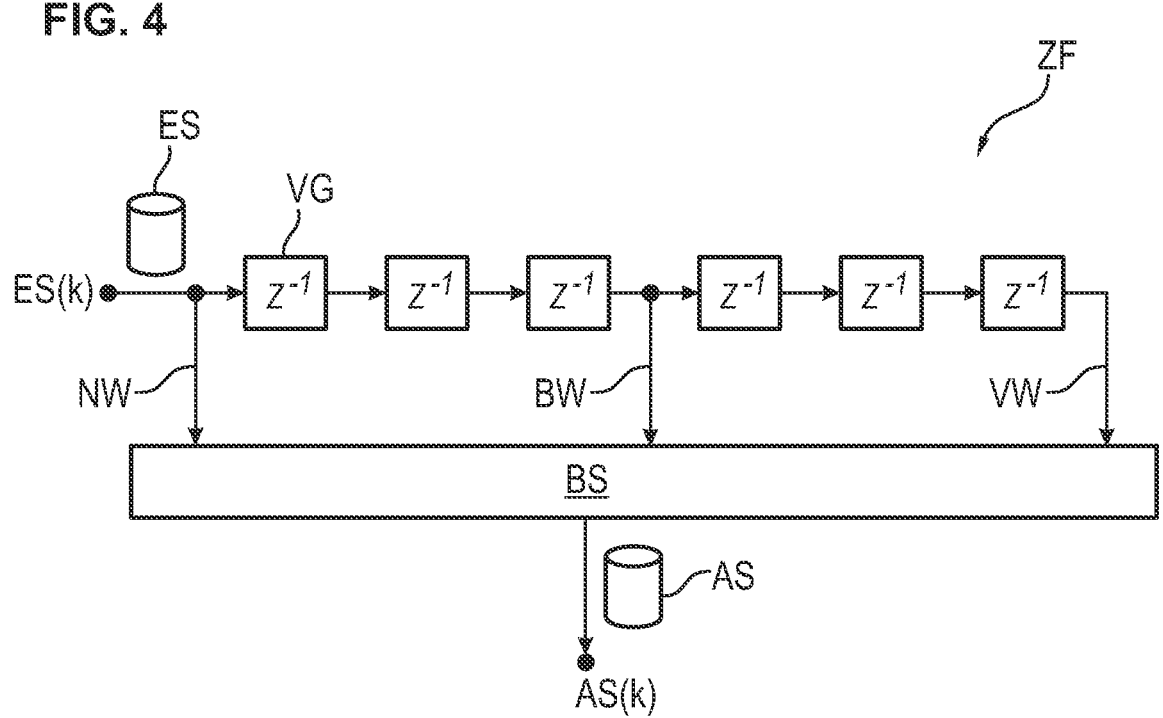
Figure 5:
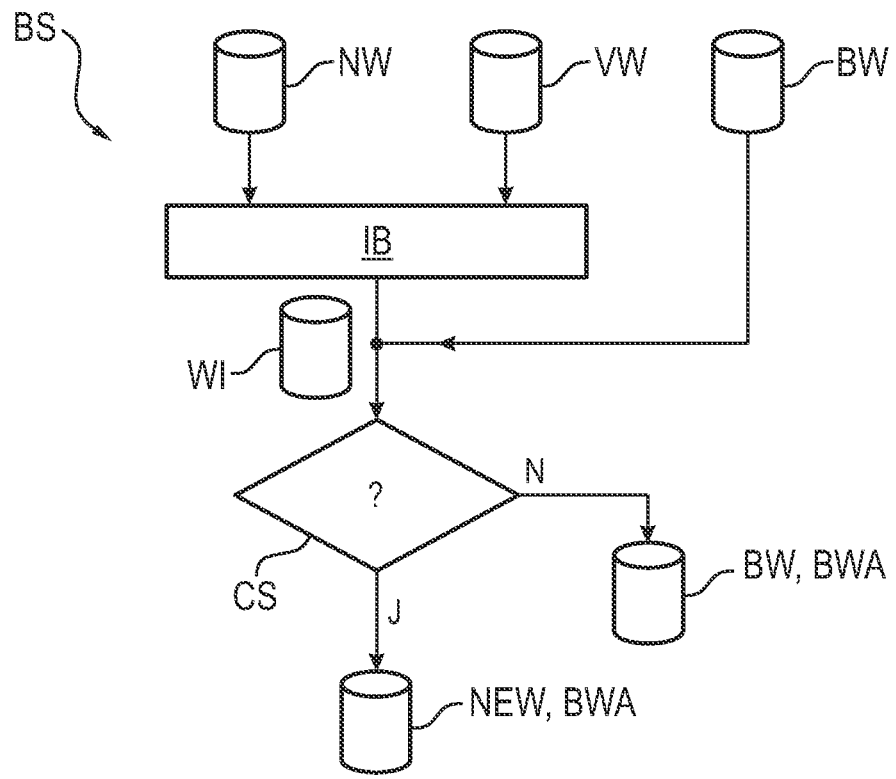
Figure 6A:
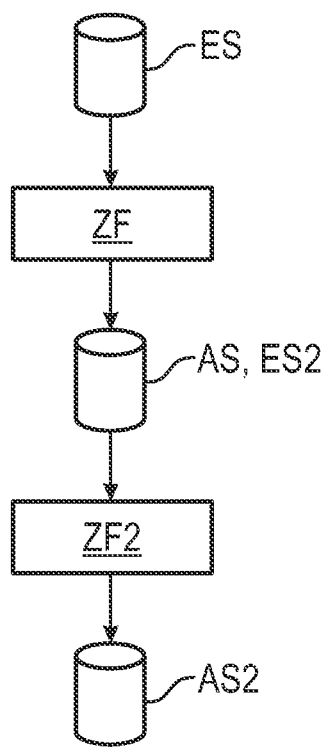
Figure 6B:
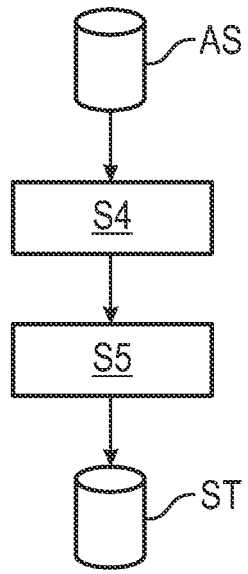
Figure 7:
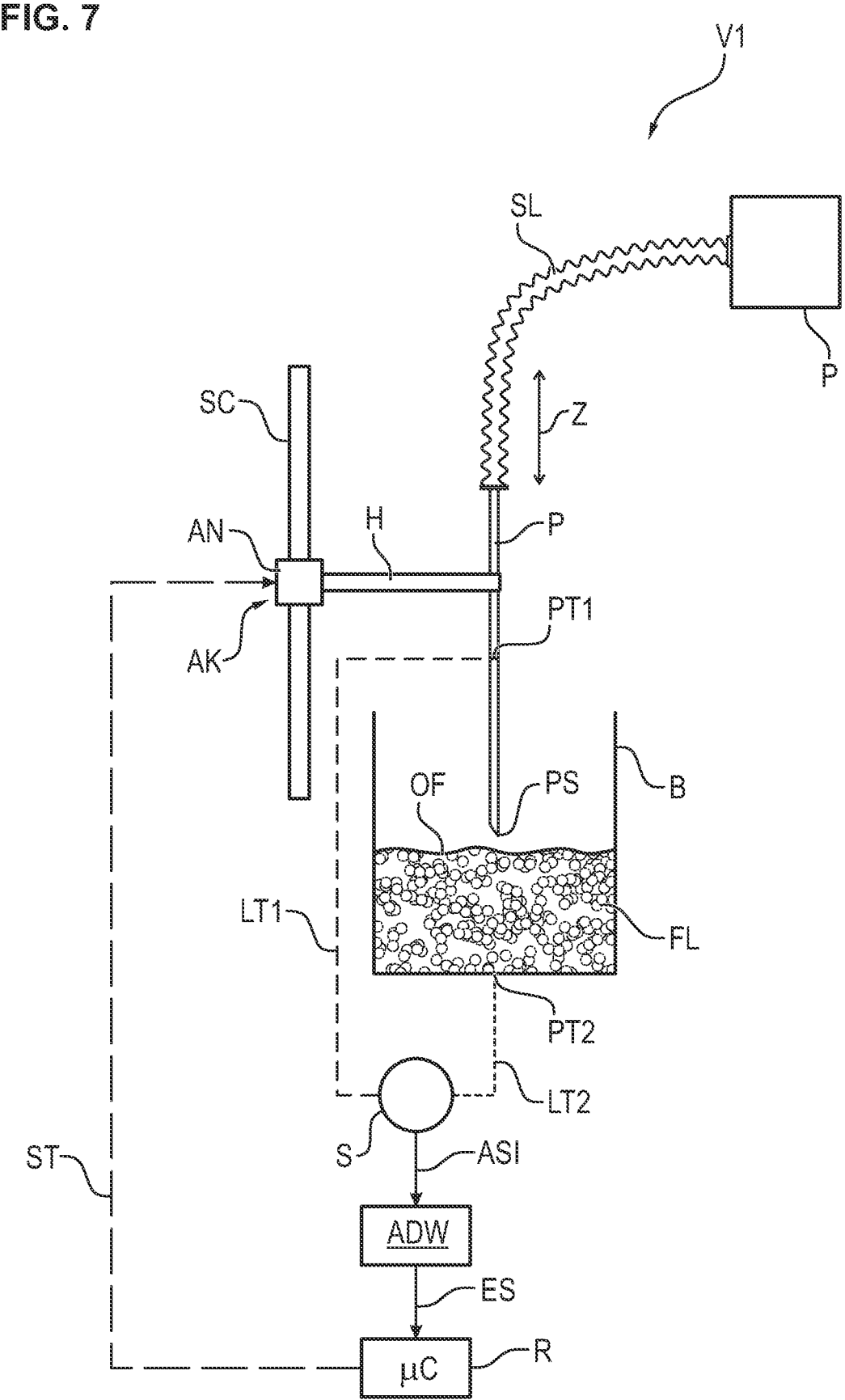
Figure 13A:
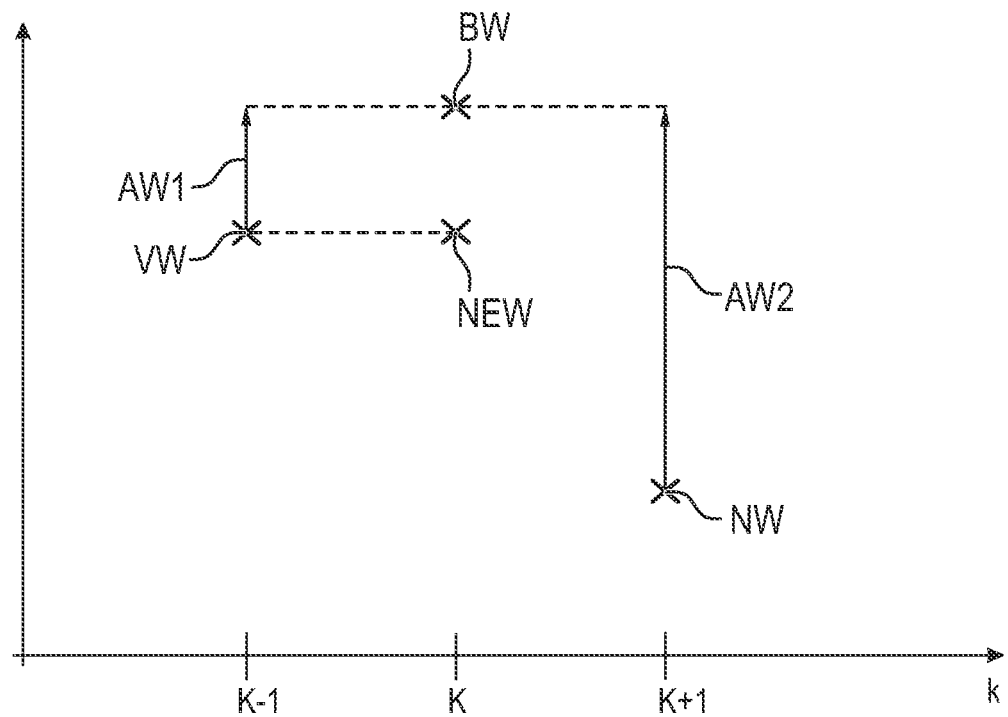

In the following, the invention is explained in detail with reference to the figures using specific embodiments but without limiting the general idea of the invention. In the drawings:

FIG. 1 shows a block diagram illustrating different components and signals,

FIG. 2 shows a representation of a time-discrete input signal and a time-discrete output signal, FIG. 3 shows steps of a preferred embodiment of the method according to the invention, FIG. 4 shows a block diagram illustrating a time-discrete filter, FIG. 5 shows steps for determining a value of a time-discrete output signal, FIGS. 6A and 6B show preferred steps of preferred embodiments of the method according to the invention, FIG. 7 shows a preferred embodiment of a device according to the invention, FIG. 8 shows an exemplary input signal or time-discrete sensor signal, FIG. 9 shows a first derivative of the input signal, FIGS. 10A and B show a first filtered output signal and its first derivative, FIGS. 11A and B show a further filtered output signal and its first derivative, FIGS. 12A and B show an example of a filtered output signal according to the invention and its first derivative, FIGS. 13A and B show exemplary embodiments for determining a new value.

A sensor S, which is preferably a capacitive sensor, provides an analogue sensor signal ASI. The signal ASI is converted using a converter unit ADW, preferably an analogue-to-digital converter, into a time-discrete sensor signal ZS, which can also be interpreted as a time-discrete input signal ES. A computing unit R then filters the input signal ES to determine a time-discrete output signal AS. Preferably, the computing unit R provides this output signal AS.

Preferably, the computing unit R detects an event when a significant signal change is detected on the basis of the output signal AS or in the output signal AS. Preferably, the computing unit R then controls an actuator AK using a control signal ST to be output when the event is detected.

As explained above, in principle different sensors S can be used. The respective analogue sensor signals AS of the respective sensors S can then be filtered using the method according to the invention. The invention is not limited to specific sensor types, since the aforementioned problems, such as additive noise or interference pulses and filtering of the input signal to obtain the best possible preservation of the slope, occur in sensor signals of various sensor types.

FIG. 2 shows an input signal ES, which has a certain value BW at a fully specified time-discrete point k=N. The signal ES also has a predecessor value VW, which existed, for example, three discrete time points prior to the time point k=N−3. In addition, the input signal ES has, for example, a successor value NW, which occurs three discrete time points later in the input signal ES at time k=N+3.

Based on the values VW, BW, NW, an output value BWA of the output signal AS is determined for the specified time point k=N. The output value BWA is determined in such a way that either the specified signal value BW of the input signal ES is retained for the time k=N or that the specified signal value BW is replaced by a new value depending on the two further signal values VW, NW, depending on a value interval spanned by the two further signal values VW, NW. More detailed explanations of this will now follow.

FIG. 3 shows a step S1 in which the time-discrete sensor signal is provided as the signal ZS, which represents the one input signal ES.

In a step S2, a specified signal value of a specified time index of the input signal ES is compared with two further signal values of the input signal, wherein a first signal value, the value VW from FIG. 2, of the two further signal values is located temporally prior to the specified signal value, and wherein a second signal value, the value NW from FIG. 2, of the further signal values is located temporally after the specified signal value.

In a step S3, the specified signal value is replaced by a new value depending on a value interval spanned by the two additional signal values, in order to determine the output signal AS. In abstract terms, it can be stated that the specified signal value BW in the output signal AS is then simply replaced by a new value depending on the two additional signal values NW, VW.

FIG. 4 shows a preferred embodiment of a time-discrete filter ZF in a representation as a block diagram, in which the input signal ES with its time-discrete values ES(k) is fed to a chain of delay elements VG.

At a specified, exemplary time, it can be assumed without restriction of generality that, for example at this instant illustrated here, at the input of filter ZF the successor value NW is present, after three delay elements VG the specified signal value BW is present, and after a further three delay elements, the preceding value VW.

In a determination step BS, the output signal AS is then determined and output with its time-discrete values AS(k).

FIG. 5 shows detailed steps of a preferred embodiment of the method according to the invention.

In particular in the event that a predefined condition is fulfilled by the specified value BW with respect to the value interval of the values VW, NW, the specified signal value BW is replaced by a new value. In the event that the predefined condition is not fulfilled by the specified value with respect to the value interval, in particular, the specified signal value BW is retained unchanged in the output signal.

The values NW and VW are used in a step IB to determine the value interval WI and its limits.

In a comparison step CS, the specified BW value is then compared with the value interval WI. In this case, a predefined condition is tested with respect to the specified value BW and the value interval WI, or with respect to the specified value BW and the values NW, VW.

If the predefined condition is fulfilled, the specified signal value BW is replaced by a new value NEW, which is then the output value BWA that is output in the output signal AS, as shown in FIG. 2.

If the predefined condition is not fulfilled by the specified value BW with respect to the values NW, VW or their value interval, then the specified signal value BW is retained unchanged and output in the output signal AS as the output value BWA, as can be seen in FIG. 2.

In particular in the event that the specified signal value BW lies within the value interval spanned by the two further signal values NW, VW, the specified signal value BW at the specified time index is retained unchanged. Furthermore, in particular in the event that the specified signal value BW does not lie within the value interval spanned by the two further signal values NW, VW, but in fact in particular outside it, the specified signal value at the specified time index is replaced by the new value NEW.

For example, determination of the new value and the condition checking can be described by the fact that, without restriction of generality, in the event that the successor value NW is less than the predecessor value VW, $$NW < VW$$

the condition can then be formulated as $$BW \in [NW, VW]$$

If this condition that the specified value BW lies within the spanned value interval [NW,VW] is fulfilled, then the new value NEW must be determined according to the further signal values NW, VW. If this condition is not fulfilled, the specified value BW is retained as the output value BWA.

For example, determination of the new value and the condition testing can be described by the fact that, without restriction of generality, in the event that the successor value NW is greater than the predecessor value VW, $$NW > VW$$

the condition can then be formulated as $$BW \in [VW, NW]$$

If this condition that the specified value BW lies within the spanned value interval [NW,VW] is fulfilled, then the new value NEW must be determined according to the further signal values NW, VW. If this condition is not fulfilled, the specified value BW is retained as the output value BWA.

In other words: the specified signal value BW in the output signal is then preferably replaced by a new value depending on a value interval $$[VW, NW]$$

spanned by the two further signal values NW, VW, if the specified signal value BW is outside the value interval spanned by the two further signal values NW, VW $$[VW, NW].$$

In this case, the new value NEW should preferably be determined as the arithmetic mean of the further signal values NW, VW as $$NEW = \frac{1}{2}(NW + VW)$$

In particular, it is preferable to apply a weighting to the other signal values NW, VW in accordance with $$NEW = (0.6 \cdot NW + 0.4 \cdot VW)$$

In particular, the new value can be selected as one of the two further signal values, wherein the specified value has a smaller deviation from the selected one of the two further signal values than a deviation from the other of the two further signal values that is not selected.

An example of this is illustrated in FIG. 13A. The specified value BW has a deviation AW1 from a value VW of the two further signal values VW, NW. Relative to the other signal NW of the two further signal values VW, NW the specified value BW has a deviation AW2. The deviation AW1 is smaller than the deviation AW2. Therefore, the new value NEW is selected as a value which is equal to the value VW.

Figure 13B:
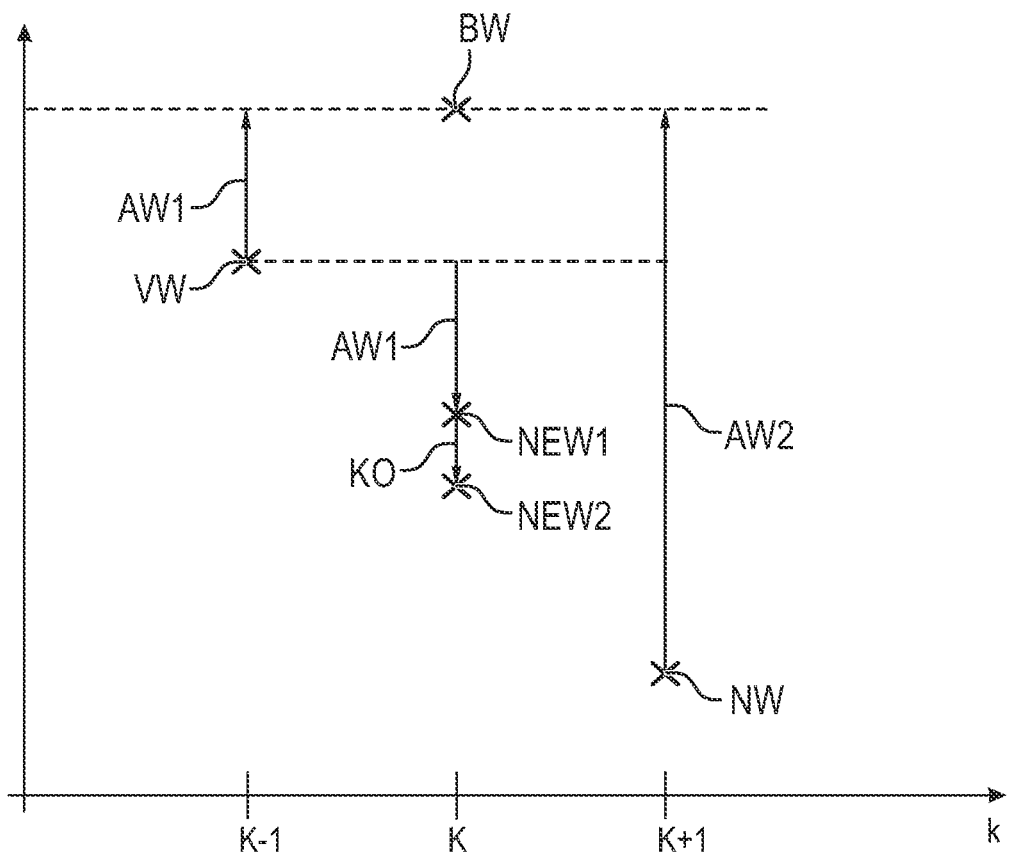

Preferably, the new value is determined depending on one of the two further signal values from which the specified value has a smaller deviation, and on a difference of the specified signal value and the one of the two further signal values. FIG. 13B shows an exemplary embodiment of this. The specified value BW has a deviation AW1 from the value VW and a deviation AW2 from the value NW. Thus, from the two other signal values VW, NW the one value VW of the two other signal values VW, NW is selected, since this value has a smaller deviation AW1 from the specified value BW than the other value NW with its deviation AW2. The new value NEW1 is then determined by subtracting the difference AW1 between the one value VW of the two other signal values VW, NW and the specified value of this value VW, from the one value VW of the two other signal values VW, NW.

Particularly preferably, a new value NEW2 is determined depending additionally on a correction value KO. This involves an additional subtraction of the correction value KO from the previously determined value NEW1.

The other signal values NW, VW each have in particular an equal temporal distance to the specified signal value. This was a distance of three time indices, as shown in FIG. 2.

Preferably, a temporal distance of a successor value NW can be greater than that of a predecessor value VW.

The effectiveness of the method according to the invention has already been explained above with reference to FIGS. 8-12.

FIG. 6A shows preferred steps of a preferred embodiment of the method according to the invention.

Here, a time-discrete filter ZF is first applied to the input signal ES of a first filter stage to generate the output signal AS. The output signal AS can then be provided as a second input signal ES to a second filter stage, in which a time-discrete filter ZF2 is applied to the second input signal ES2. Preferably, the second time-discrete filter ZF2 can be identical to the first time-discrete filter ZF. Alternatively, for example, the time intervals between the specified value BW and the other signal values VW, NW in the second filter stage of the second time-discrete filter ZF2 can be chosen differently than those in the first filter stage with the time-discrete filter ZF.

The second filter stage then applies the time-discrete filter ZF2 to the second input signal in the second filter stage to generate a second output signal AS2.

Such applications of cascaded time-discrete filters ZF, ZF2 in series may achieve even better filtering results.

In particular, in the first filter stage the two further signal values have a first equal temporal distance to the specified signal value and in the second stage the two further signal values have a second equal temporal distance to the specified signal value, wherein the second temporal distance is greater than the first temporal distance.

FIG. 6B shows further preferred steps. Based on the output signal AS, in a step S4 an event is detected when a significant signal change is detected on the basis of the output signal. In a step S5, an actuator is then controlled upon detection of the event, for example by outputting the control signal ST.

FIG. 7 shows a preferred embodiment V1 of a device according to the invention.

In this case, an application is shown in which an actuator AK is controlled by a computing unit R depending on the sensor signal AS of the sensor S. Further applications are possible, for example, using pressure sensors, humidity sensors and temperature sensors.

A container B contains a fluid FL, which is to be aspirated to a certain volume using a pipetting needle P. For example, the pipetting needle is connected via a hose SL to a pump P. The pipetting needle P is connected via a holder H, for example, to an actuator AK or its drive unit AN.

For example, the actuator AK can be a linear motor in which a drive unit AN runs along a rail SC and can be controlled.

In this application, the pipetting needle P is designed to be moved downwards in the Z direction using the actuator AK until the tip PS of the pipetting needle P comes into contact with the surface OF of the fluid FL. For example, this is monitored by a capacitive measurement using a capacitive sensor S. In this case, a capacitive sensor S can be connected via a second lead LT2 to a potential point PT2 of the container B and via a first lead LT1 to a further potential point PT1 of the pipetting needle P.

The sensor S provides the sensor signal ASI as an analogue signal, which is converted using the converter unit ADW into a time-discrete input signal ES. This signal ES is filtered by the computing unit R. The computing unit R controls the actuator AK.

The control signal ST as a control signal is, for example, a specified control signal for the actuator upon detection of the event that the tip PS of the pipetting needle P touches the surface OF of the fluid FL. In such a case, for example, the control signal can then be a stop signal in order to stop the actuator so that the tip PS of the pipetting needle P is not immersed further.

For an aspiration process, for example, after the actuator AK has been stopped, the actuator can be controlled in such a way that the pipetting needle with its tip PS is moved downwards by a further predefined distance in the Z direction, in order to then be able to aspirate a specific volume of fluid.

The method of the actuator AK along the predefined distance can be monitored, for example, by monitoring encoder signals on the actuator AK or its motor, wherein in particular a starting position and a speed of movement of the actuator AK can be known. Furthermore, in the case of non-linear motion or non-constant speed in the motion a start-up behaviour of the actuator AK in the Z direction can be known and taken into account.

In particular, on the basis of an encoder signal on the actuator AK, a fill level or the residual volume of fluid FL in the container B can preferably be optionally calculated.

Many factors can affect the signal, such as geometry and material, fluids and fill levels, and parasitic interference effects.

A particular problem is the detection of the event of the contact of the pipette tip PS with the surface OF the liquid FL, in particular for low fill levels.

Detection of the event must be as robust and generally valid as possible. In this application, for example, a decision must be made within seven measurement values or time-discrete instants with index K, so that a higher signal latency of the signal filtering would be unfavourable.

Although some aspects have been described in connection with a device, it goes without saying that these aspects also represent a description of the corresponding method, so that a block or a component of a device is also to be understood as a corresponding method step or as a feature of a method step. Similarly, aspects that have been described in relation to or as a method step also represent a description of a corresponding block or detail or feature of a corresponding device.

Depending on the specific implementation requirements, exemplary embodiments of the invention can be implemented either in hardware or in software. The implementation can be carried out by using a digital storage medium, such as a floppy disk, a DVD, a Blu-Ray disc, a CD, a ROM, a PROM, or an EPROM, EEPROM or Flash memory, a hard disk or other magnetic or optical storage, on which electronically readable control signals are stored, which can interact with a programmable hardware component, or interact in such a way that the respective method is carried out.

A programmable hardware component such as the computing unit mentioned here can be formed by a processor, a computer processor (CPU=Central Processing Unit), a graphics processor (GPU=Graphics Processing Unit), a computer, a computer system, an application-specific integrated circuit (ASIC), an integrated circuit (IC), a single-chip system (SOC=System-on-Chip), a programmable logic element or a field-programmable gate array (FPGA) with a microprocessor.

The digital storage medium can therefore be machine- or computer-readable. Some exemplary embodiments thus comprise a data carrier, which has electronically readable control signals that are capable of interacting with a programmable computer system or a programmable hardware component, in such a way that one of the methods described herein is carried out. One exemplary embodiment therefore is a data carrier (or a digital storage medium or a computer-readable medium), on which the program is recorded for carrying out one of the methods described herein.

In general, exemplary embodiments of the present invention can be implemented as software, firmware, computer program or computer program product with a program code or as data, wherein the program code is, or the data are, effective in terms of carrying out one of the methods if the program is running on a processor or a programmable hardware component. The program code or the data can also be stored, for example, on a machine-readable medium or data carrier. The program code or the data can exist in the form of source code, machine code or byte code, among other things, as well as other intermediate code.

The exemplary embodiments described above only represent an illustration of the principles of the present invention. It is implicit that modifications and variations of the arrangements and details described herein will be apparent to other persons skilled in the art. It is therefore intended that the invention be limited only by the scope of protection of the following patent claims and not by the specific details, which have been presented herein on the basis of the description and explanation of the exemplary embodiments.

The invention claimed is:

1. Method for filtering a sensor signal, comprising
providing a time-discrete sensor signal (ZS) as an input signal (ES),
generating an output signal (AS) via continuous filtering of the input signal (ES) using a time-discrete filter (ZF) in the time domain, which performs the following filter steps for each value of the input signal (ES):
comparing a specified signal value (BW) of a specified time index of the input signal (ES) with two further signal values (VW, NW) of the input signal (ES), wherein a first signal value (VW) of the two further signal values (WV, NW) is temporally prior to the specified signal value (BW) and wherein a second signal value (NW) of the further signal values (VW, NW) is temporally after the specified signal value (BW),
in the event that the specified signal value (BW) lies within the value interval spanned by the two further signal values (VW, NW), retaining the specified signal value (BW) unchanged at the specified time index,
in the event that the specified signal value (BW) is not within the value interval spanned by the two further signal values (VW, NW), replacing the specified signal value (BW) in the output signal by a new value.

2. Method according to claim 1,
characterized in that the new value (NW) is determined on the basis of the two further signal values (VW, NW).

3. Method according to claim 2,
characterized in that the new value (NW) is determined as the mean value of the two further signal values (WV, NW).

4. Method according to claim 2,
characterized in that the new value (NEW) is selected as one of the two further signal values (VW, NW) from which the specified value (BW) has a smaller deviation.

5. Method according to claim 2,
characterized in that the new value (NW1) is determined in dependence on
one of the two further signal values (VW) from which the specified value (BW) has a smaller deviation (AW1),
and a difference (AW1) between the specified signal value (BW) and the one of the two further signal values (VW).

6. Method according to claim 2,
characterized in that the new value (NEW2) is determined in dependence on
one of the two further signal values (VW) from which the specified value (BW) has a smaller deviation (AW1),
and also a difference (AW1) between the specified signal value (BW) and the one of the two further signal values (VW)
and also a correction value (KO).

7. Method according to claim 1,
wherein the two further signal values (VW, NW) each have an equal temporal distance to the specified signal value (BW).

8. Method according to claim 1, comprising
applying the time-discrete filter (ZF) of claim 1 to the input signal (ES) in a first filter stage for generating the output signal (AS),
providing the output signal (AS) of the first filter stage (ZF) as a second input signal (ES2) of a second filter stage (ZF2),
applying the time-discrete filter of claim 1 to the second input signal (ES2) in the second filter stage (ZF2) for generating a second output signal (AS2).

9. Method according to claim 8,
wherein in the first filter stage (ZF) in the time-discrete filter the two further signal values (VW, NW) each have a first equal temporal distance to the specified signal value (BW),
wherein in the second filter stage (ZF) in the time-discrete filter the two further signal values (VW, NW) each have a second equal temporal distance to the specified signal value (BW),
and wherein the second temporal distance is greater than the first temporal distance.

10. Method according to claim 1, comprising
detecting an event upon detecting a significant signal change on the basis of the output signal (AS), and
controlling an actuator (AK) upon detection of the event.

11. Method according to claim 1, comprising
acquiring the sensor signal (ZS) using a capacitive sensor.

12. Device for controlling an actuator by filtering a sensor signal, comprising
a sensor (S) for acquiring an analogue sensor signal (ASI), in particular a capacitive sensor,
a converter for providing the analogue sensor signal (ASI) in the form of a time-discrete sensor signal (ZS) as an input signal (ES),
a computing unit (R) for receiving the input signal (ES), and
an actuator (AK)
wherein the computing unit (R) is designed to carry out the following steps:
generating an output signal (AS) via of continuous filtering of the input signal (ES) using a time-discrete filter (ZF) in the time domain, wherein the filter (ZF) carries out the following filter steps for a respective value of the input signal (ES):
comparing a specified signal value (BW) of a specified time index of the input signal (ES) with two further signal values (VW, NW) of the input signal (ES), wherein a first signal value (VW) of the two further signal values is temporally prior to the specified signal value (BW) and wherein a second signal value (NW) of the further signal values is temporally after the specified signal value (BW),
in the event that the specified signal value (BW) lies within the value interval spanned by the two further signal values (VW, NW), retaining the specified signal value (BW) unchanged at the specified time index, in the event that the specified signal value (BW) is not within the value interval spanned by the two further signal values (VW, NW), replacing the specified signal value (BW) in the output signal (AS) by a new value, further comprising detecting an event by detecting a significant signal change on the basis of the output signal (AS), and outputting a control signal to the actuator (AK) upon detection of the event.

13. Device according to claim 12, wherein the control signal is a signal to activate the actuator (AK)

or wherein the control signal is a signal to stop the actuator (AK).

* * * * *